United States Patent [19]

Cronin et al.

[11] 4,419,926
[45] Dec. 13, 1983

[54] ESC ENERGY RECOVERY SYSTEM FOR FUEL-EFFICIENT AIRCRAFT

[75] Inventors: Michael J. Cronin, Sherman Oaks; Gordon Seid, Los Angeles, both of Calif.

[73] Assignee: Lockheed Corporation, Burbank, Calif.

[21] Appl. No.: 183,499

[22] Filed: Sep. 2, 1980

[51] Int. Cl.³ .............................................. B64D 13/02
[52] U.S. Cl. ........................................ 98/1.5; 237/11
[58] Field of Search ................ 98/1.5; 165/15; 237/11

[56] References Cited

U.S. PATENT DOCUMENTS

| | | | |
|---|---|---|---|
| 2,284,984 | 6/1942 | Nixon et al. | 98/1.5 |
| 2,297,495 | 9/1942 | Pfau | 98/1.5 |
| 2,479,991 | 8/1949 | Wood | 98/1.5 |
| 2,491,461 | 12/1949 | Wood | 98/1.5 X |
| 2,491,462 | 12/1949 | Wood | 98/1.5 |
| 2,585,570 | 2/1952 | Messinger et al. | |
| 2,614,815 | 10/1952 | Marchant | |
| 2,678,542 | 5/1954 | Stanton | |
| 2,697,917 | 12/1954 | Mayer | |
| 2,734,356 | 2/1956 | Kleinhans | 98/1.5 X |
| 2,734,443 | 2/1956 | Wood | 98/1.5 |
| 2,777,301 | 1/1957 | Kuhn | |
| 2,851,254 | 9/1958 | Messinger et al. | |
| 3,326,109 | 6/1967 | Markham | 98/1.5 |
| 3,369,777 | 2/1968 | Furlong | |
| 3,711,044 | 1/1973 | Matulich | 98/1.5 X |
| 4,091,613 | 5/1978 | Young | |

FOREIGN PATENT DOCUMENTS

| | | | |
|---|---|---|---|
| 900173 | 12/1953 | Fed. Rep. of Germany | 98/1.5 |
| 976632 | 3/1951 | France | 98/1.5 |
| 768975 | 2/1957 | United Kingdom | 98/1.5 |

Primary Examiner—Albert J. Makay
Assistant Examiner—Harold Joyce
Attorney, Agent, or Firm—L. L. Dachs

[57] ABSTRACT

The invention is an energy recovery system (20) which uses excess air emanating from an aircraft cabin (16) to drive a turbo-compressor unit (30). The outlet air from the compressor (26) of turbo-compressor unit (30) is optionally fed, either around or through heat exchanger (24), back into the aircraft cabin (16) inlet line, reducing the amount of bleed air required to power the aircraft ECS. Mass flow sensors (34) and (38) are used, via flow control valve (36) and flow control valve control unit (40), to monitor and control the amount of engine bleed air required at any point in time to satisfy overall ECS requirements. The energy recovery system (20") may be utilized in conjunction with a motor driven cabin compressor (42) to reduce the output air requirements of the compressor and thus the weight and horsepower requirements of the compressor motor. In another embodiment, the outlet of the compressor (26) is used to supercharge the inlet of the motor driven cabin compressor (42), reducing the weight and horsepower motor requirements of the ECS.

12 Claims, 4 Drawing Figures

ESC ENERGY RECOVERY SYSTEM FOR FUEL-EFFICIENT AIRCRAFT

TECHNICAL FIELD

The invention relates generally to the field of aircraft environmental control systems (ECS), and more particularly to an ECS energy recovery system which conserves energy, and thus reduces fuel consumption.

BACKGROUND ART

In many aircraft, the environmental control system, ECS, is powered from engine "bleed air", i.e. air extracted from bleed-ports located at the intermediate and last stages of the aircraft engine compressors. This is premium-air inasmuch as it impacts very unfavorably on the performance of the engine, and results in thrust losses and fuel penalties on the engine. In the guest for fuel-efficient air-transports, it is essential that the method of extracting power for the air conditioning system, be optimized from a power and fuel consumption point of view.

It is of importance and relevant to short-haul and short-to-mediumn range aircraft that the same quest for fuel-conservation in these aircraft could lead to the selection of turbo-prop engines. These engines, however, have lower "core-flows" than the jet engines and, as a consequence, the amount of air available for cabin air conditioning is usually more limited. At the same time, these aircraft also have a high passenger-density-to-aircraft-volume and therefore require good air ventilations rates. On the other hand, many wide-bodied aircraft (which have lower passenger/volume densities), often dump large amounts of cabin air overboard, in order to take on adequate quantities of fresh air. This also reflects as a significant weight and fuel-penalty.

One prior art method of providing power to aircraft ECS systems is to utilize the aircraft engines to mechanically drive the cabin compressors, usually via a gearbox arrangement between the engine and the compressor. Systems such as this are exemplified in U.S. Pat. Nos. 2,614,815 to Marchant et al, 2,585,570 to Messinger et al, 2,678,542 to Stanton, and 2,697,917 to Mayer.

While not using bleed air, these systems often involve nevertheless, use of complex gear drives, placement of compressors in hostile wing environments, and less than ideal fuel consumption characteristics.

Yet another method of driving cabin compressors is disclosed in copending U.S. patent applications U.S. Ser. No. 181,079, filed Sept. 2, 1980, now abandoned for "Direct-Driven Generator System for Environmental Control System and Engine Starting", and U.S. Ser. No. 183,609, filed Sept. 2, 1980, for "All-Electric Environmental Control System For Advanced Transport Aircraft", both assigned to the assignee herein. Both of these applications describe various types of ECS systems which are operated by an electric motor driven compressor. These systems afford enhanced fuel conservation and several other advantages over the bleed air and engine-driven systems discussed hereinabove, and as such are quite desirable.

Several other approaches to enhancing the efficiency of ECS systems have also been attempted in the prior art. One such approah is disclosed in U.S. Pat. No. 3,711,044 to Matulich. The Matulich patent teaches utilizing an auxiliary gas turbine power unit to reduce the fuel demand of a conventional bleed air ECS by varying the speed of the compressor which supplies pressurized air to the ECS. This approach to increasing the efficiency of the ECS system is based upon a complex control system for the integration of the ECS and the auxiliary power unit (APU) to provide partial control of the APU in response to ECS requirements.

Another group of prior art patents teach the utilization, at least to some extent, of aircraft cabin discharge air within an ECS system ostensibly designed for greater efficiency. U.S. Pat. No. 2,479,991 to Wood, for example, discloses a primary cabin compressor driven by an APU which is mechanically driven, via an overrunning clutch, by two turbines. Air from the primary compressor is cooled by expansion through a first turbine, which in turn, mechanically unloads the primary compressor via the overrunning clutch. In addition, cabin air is discharged through a second turbine which also augments the compressor via the overruning clutch. This system involves mechanical energy feedback, and is complex from a control standpoint. In addition, the system can only input mechanical energy back to the compressor when the turbines can drive through the "free running" clutch.

Other approaches to using cabin discharge air to increase ECS efficiency can be found in U.S. Pat. Nos. 2,491,462 to Wood, 2,851,254 to Messinger et al, 2,777,301 to Kuhn, and 4,091,613 to Young. All of these patents to some extent, utilize gas turbine power units (GTPU) interfaced with ECS systems. These systems utilize several types of rotational elements, combustors and the like to superheat and expand cabin discharge air and put it back into the ECS. Such systems are typically complex and expensive, and more importantly, are less than ideally fuel efficient in that they use additional energy in the form of gas turbine fuel.

Yet another approach to utilizing cabin discharge air can be found in U.S. Pat. No. 3,369,777 to Furlong. Furlong teaches using cabin discharge air to drive an air turbine, which in turn drives a suction fan that draws air through the double wall of the cabin. The discharge air also drives a compressor that recompresses the discharge air before it is discharged overboard. The compressor is utilized to load the turbine. While this system recovers some of the energy of the cabin discharge air, it nevertheless is less than ideally efficient vis-a-vis fuel comsumption and aircraft ECS operation.

While all of the systems of the above prior art United States patents and copending applications, incorporated by reference herein, are directed to obtaining various levels of efficiency in aircraft ECS and airflow systems, it is, nevertheless, desirable that aircraft ECS systems be optimized in terms of efficiency in view of the present day strong need for fuel-efficient air transports. It is essential, then, that the energy and fuel consumption in extracting power for aircraft ECS be optimized (minimized), whether that power is extracted via engine "bleed air", "mechanical" or "electrical" power systems.

Thus, it is a primary object of this invention to provide a method and system for optimizing aircraft ECS systems in terms of energy, and thus, fuel consumption.

It is another object of this invention to provide an "energy utilization" or fresh-air "make-up" system for optimizing "bleed-air", "mechanical", and "electrical" ECS systems in aircraft.

It is yet another object of this invention to provide a system for pressurizing-the-inlet of electrically or mechanically driven ECS cabin compressors to optimize such ECS systems in terms of fuel consumption.

It is another object of the present invention to provide a system for feeding-back power to an electric motor which drives a cabin compressor in an ECS, to reduce the load on the motor and thereby conserve energy.

DISCLOSURE OF INVENTION

The invention comprises a system and process for the utilization of waste energy (in the form of aircraft cabin overboard discharge air) to power turbo machinery. The turbo machinery, in conjunctin with ram air, provides a fresh-air make-up system in the aircraft by supplying pressurized fresh-air to the aircraft cabin during flight. This supply of fresh-air significantly reduces the power demand for either bleed-air from the aircraft engines or drive shaft power for the cabin compressor. The turbo machinery comprises a turbo-compressor unit which is driven during flight by the differential in pressure between the cabin and outside.

In another embodiment of the invention, a turbo-compressor unit, utilizing the energy of cabin discharge air, pressurizes the inlet to a cabin compressor, thereby reducing its power demand on the electrical or mechanical drive source.

In yet another embodiment, the energy of cabin discharge air is utilized to drive an air turbine motor mounted on the same shaft as a motor which drives the cabin compressor. The air turbine motor thus provides a feedback power contribution to the motor which drives the cabin compressor.

The novel features which are believed to be characteristic of the invention, both as to its organization and to its method of operation, together with further objects and advantages thereof, will be better understood from the following description considered in connection with the accompanying drawings, in which presently preferred embodiments of the invention are illustrated by way of examples.

BRIEF DESCRIPTION OF DRAWINGS

FIG. 4 is a schematic representation of yet another "energy utilization" system embodiment of the present invention showing excess cabin energy utilized to drive an air turbine motor which provides feedback power to the motor of a motor driven compressor unit. In all drawing Figures, like numerals denote like parts.

BEST MODE OF CARRYING OUT THE INVENTION

In accordance with the present invention, four novel embodiments of an aircraft ECS air conditioning system for optimization in terms of fuel consumption are described. The methods involve the use of an energy recovery system which, depending on whether the ECS is "bleed-air" or mechanically/electrically powered, operates as a "fresh-air make-up" system, a system for "pressurizing-the-inlet" of the cabin compressor of the ECs, or as a feedback power contribution system.

Figure 1:
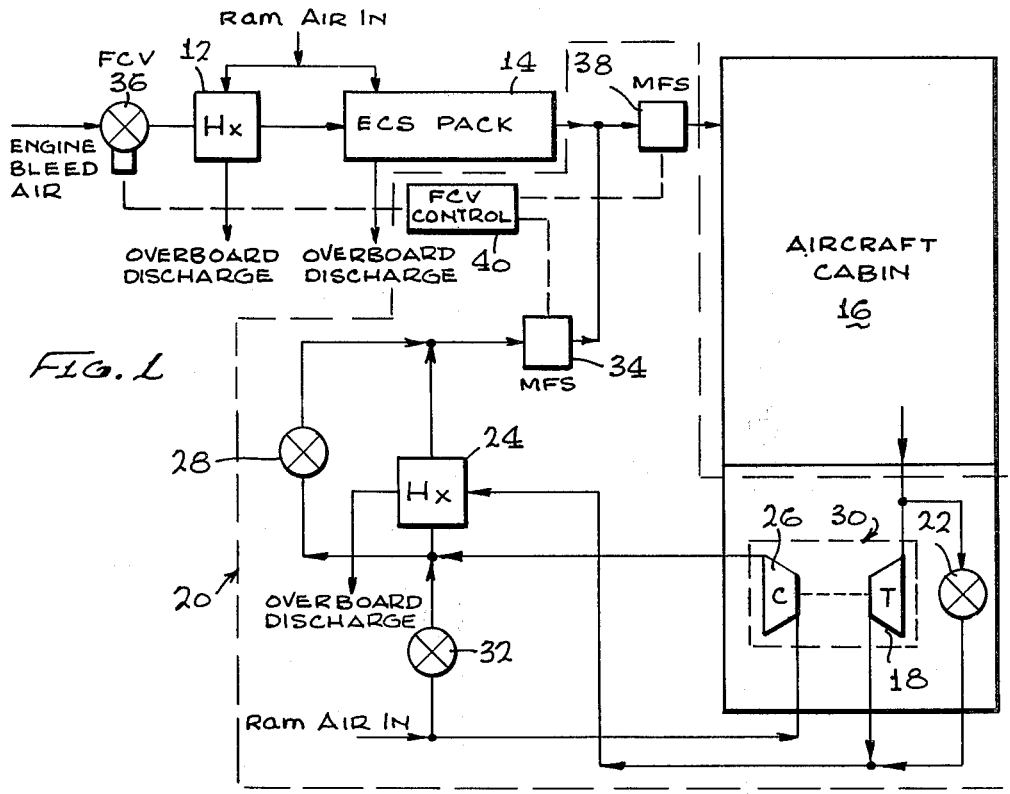
FIG. 1 is a schematic representation of an "energy utilization" "fresh-air make-up" system in accordance with a first embodiment of this invention, showing the system utilized in conjunction with a known "bleed-air" powered ECS system.

Referring now to FIG. 1, there is shown therein, a schematic of a bleed-air driven ECS utilizing a "fresh-air make-up" "energy recovery" system in accordance with the present invention. Hot pressurized bleed-air is taken from an engine (not shown) of a turbo-prop or turbo-jet/fan-jet aircraft via engine compressor taps and is cooled by the primary heat exchanger (12). The thus cooled air is then passed through the expansion cooling system pack (14), which may include known vapor-cycle or air-cycle cooling systems. Reference is made to copending U.S. Ser. No. 183,079, now abandoned and U.S. Pat. No. 2,585,570, cited hereinabove, for disclosure of various air-cycle systems, including accessories such as compressors, turbines, heat-exchangers, and the like, included therein. The conditioned and pressurized air emanating from the ECS pack (14) is delivered to the aircraft cabin (16).

Figure 2:
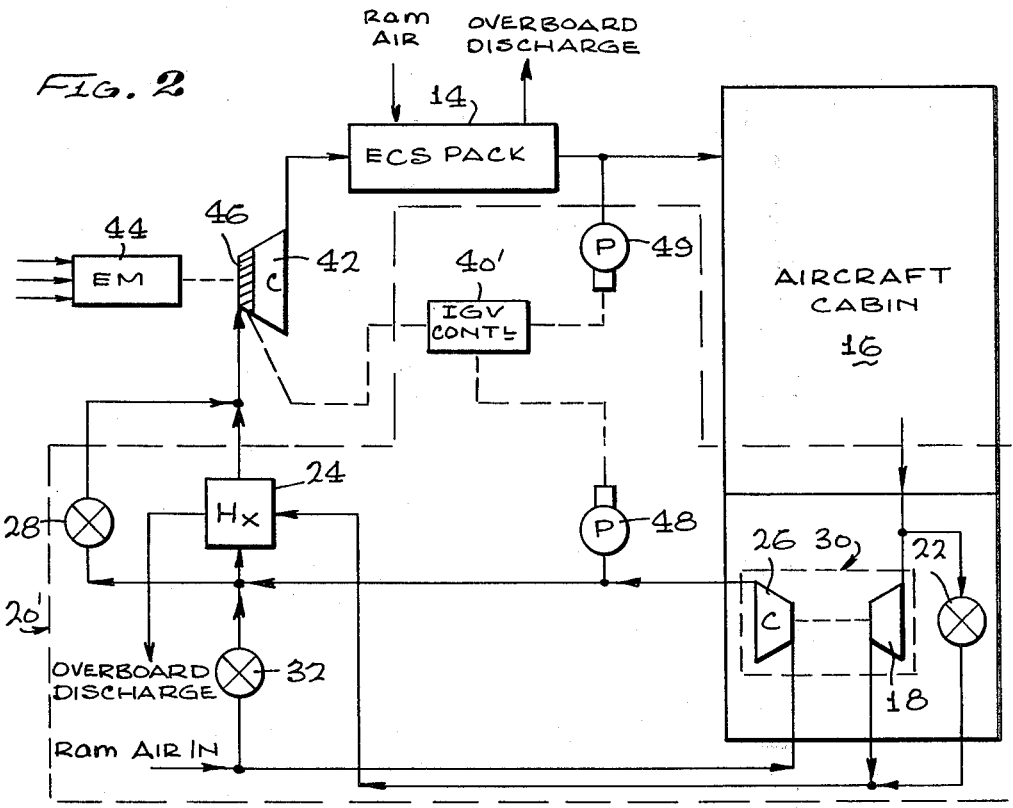
FIG. 2 is a schematic representation of a cabin compressor "pressurized inlet" system in accordance with a second embodiment of this invention, showing the "energy utilization" system utilized in conjunction with an electrically driven cabin compressor.
Figure 3:
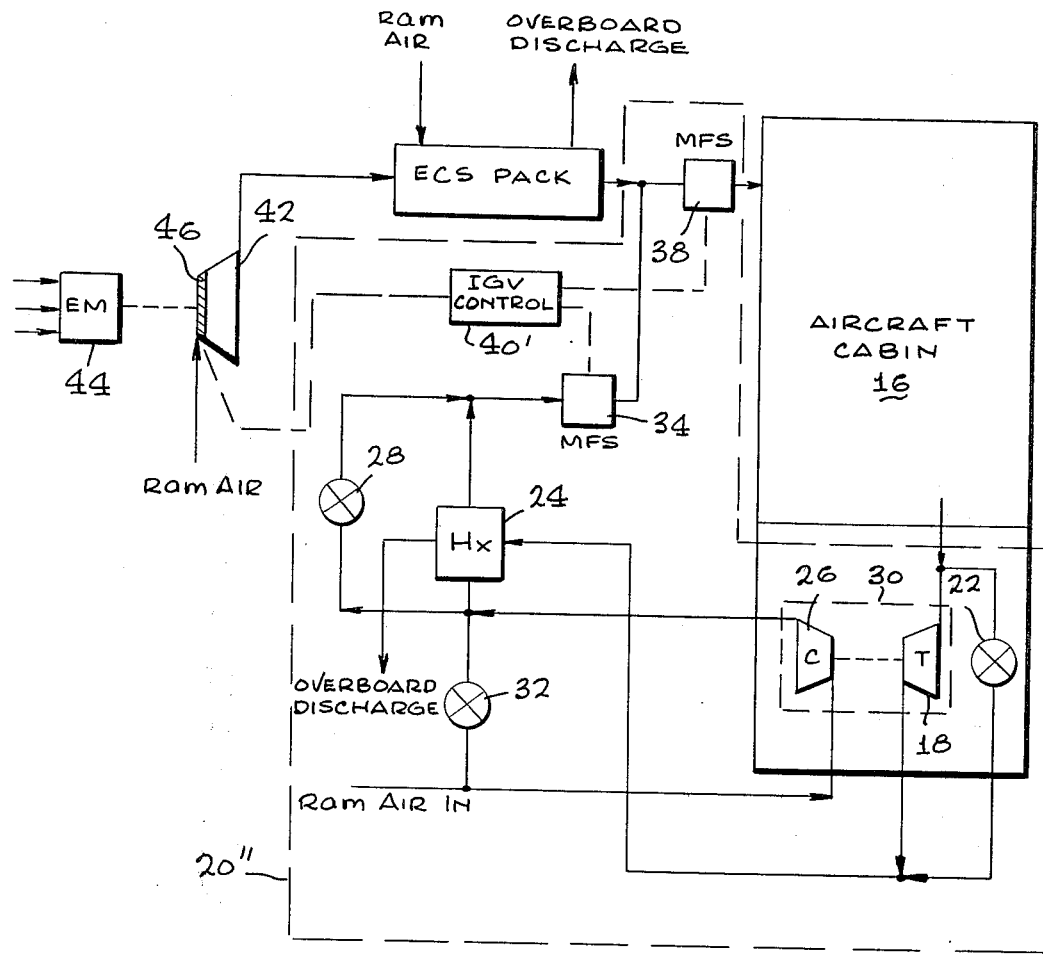
FIG. 3 is a schematic representation of a "fresh-air make-up" system similar to the one depicted in FIG. 1, showing the "energy utilization" system utilized in conjunction with an electrically driven cabin compressor.
Figure 9:
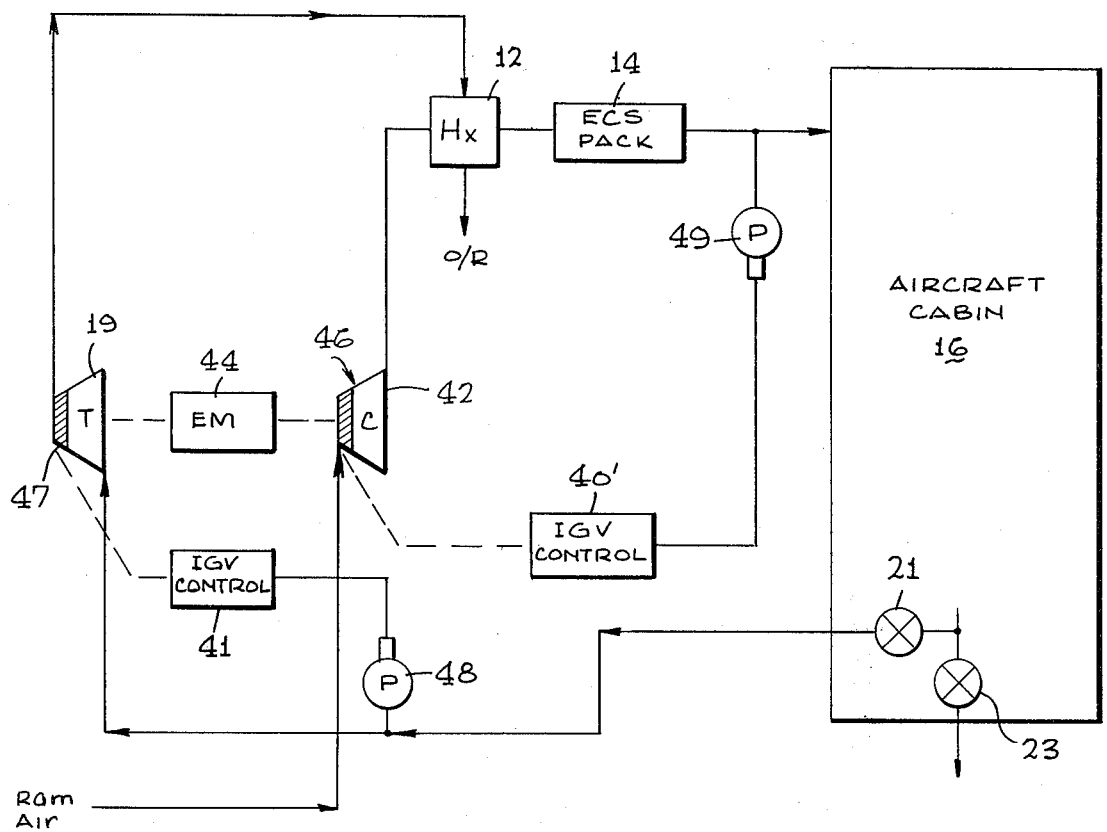

In large modern aircraft, such as the Lockheed L-1011, as much as about 400 pounds per minute of air is supplied to the cabin (16) in order to maintain the pressure and air quality desired, that is, to maintain pressurization and air supply. In such large aircraft, it is not unusual for as much as about 220 ppm of this air to be discharged overboard. Since cabin leakage is normally not excessive, this excess air represents energy which is wasted in the form of overboard release, typically through a modulating outflow valve. In accordance with one aspect of the present invention this outflow, instead of being dumped through an outflow valve, is directed through the turbine (18). The turbine (18), forms a part of the energy recovery system (20) of the present invention, and mechanically drives the compressor (26). The turbine (18) and compressor (26) are shown in FIGS. 1–3 as a single housing, turbo-compressor unit (30).

One key feature of the energy recovery system (20) lies in the utilization of what would normally be wasted overboard discharge air. By purposely recirculating or re-directing the outflow of this discharge or dump air, energy is recoverable via a turbine wheel in the form of rotational energy.

The compressor (26) is supplied with ram air, which is heated by the compressor and passed back into the aircraft cabin (16) via the heat exchanger bypass valve (28). If the air is excessively heated by the compressor (26) it may optionally be passed through the heat exchange (24) for the necessary cooling.

One of the benefits of the use of the turbine (18) lies in the fact that, in expanding the dump air supplied to it, the turbine (18) also cools this air. Thus, by passing the air exiting from the turbine (18) through the heat exchanger (24), prior to discharging it overboard, it can be utilized to cool the heated air supplied by the compressor (26). As stated above, if the air supplied by the compressor (26) is of a desired temperature, or if cabin heating is required, the heat exchanger (24) can be bypassed via the bypass valve (28), so that heated pressurized air can be fed directly to the aircraft cabin (16).

Whenever it is not desired to utilize the energy recovery system (20), discharge air may bypass the turbine (18) via operation of the turbine bypass valve (22). When the recovery system (20) is not operating during flight, it might not be desirable to back drive the compressor (26). In this instance the supply of ram air to the compressor (26) can be cut off. The bypass valve (32) can also be operated to bypass the compressor (26), allowing for ram air augmentation, that is, outside air can be utilized and brought right into the aircraft cabin (16) either during low altitude flight or for ground ventilation. If this outside air is too hot, the engine bleed air and ECS can be operated, or the outside air can be brought into the ECS pack (14) for cooling.

The fresh air contribution from the compressor (26), which is supplied with outside ram air, is typically a function of the size of the aircraft. Similarly, the quantity of air normally dumped overboard is a function of the aircraft size and the number of passengers. In a typical large aircraft, as much as 210 ppm (3.5 pps) of air may be discharged overboard. It is this energy that is used for driving the air turbine motor (18). Typically, at 35,000 ft., with a 6,000 ft cabin pressure, the airflow/pressure ratio could produce approximately 150 horsepower at the turbine shaft. If the pressure ratio of the compressor is say 2.6:1 (to provide a duct pressure of 12.5 psia at 35,000 ft.), the turbo-compressor unit (30) could provide an airflow of approximately 2.6 pounds per second (156 ppm) of "make-up" fresh air. In such a large aircraft, where the fresh (bleed) air supply might be say 5.0 pps (300 ppm), the make-up or energy recovery system (20) could thus provide approximately 52% of the total fresh air requirement.

The differential in pressure between the interior of the aircraft cabin (16) and the outside depends, of course, on the altitude of the aircraft. It should be apparent that the energy recovery system (20) can save the most energy at the higher altitudes, such as, for example at cruise altitudes of say about 39,000 feet. Such altitudes, are of course, where the great majority of the longer flights takes place. It should be evident also that the energy recovery system (20) is fortuitously applicable at the height altitudes where the reduced air density poses problems of maintaining the required air mass flow for the cabin (16).

It is, of course, necessary that bleed air make up whatever shortfall in air requirements occur when the energy recovery system (20) is in operation. To this end, mass air flow sensors (34) and (38) are utilized. The desired mass air flow into the aircraft cabin (16) at any point in time is known, and the mass flow sensor (38) continuously monitors this flow, providing a signal, such as an electric analog signal representative of that value, to the Flow Control Valve (FCV) Control unit (40). In like manner the mass flow sensor (34) monitors the mass air flow emanating from the compressor (26), sending a signal representative of the value thereof to the flow control valve control unit (40). The flow control unit (40) continuously monitors, in known manner, the differences between the required cabin mass flow and the makeup fresh-air mass flow, so as to control the motorized flow control valve (36) in response thereto, and provide the required engine bleed air input.

FIG. 2 shows a second embodiment of the present invention, wherein the energy derived from the turbo-compressor unit (30), is used to supercharge the inlet of a motor driven compressor (42). The compressor (42) is shown driven by an electric motor (44), but it should be understood that the cabin compressor (42) could be mechanically driven by the aircraft engine or any other suitable means. The cabin compressor (42) is used to provide the fresh air required by the aircraft cabin (16), in lieu of engine bleed air. The advantages of the electric motor driven system of FIG. 2 are enumerated in the aforementioned copending U.S. patent applications, U.S. Ser. No. 183,079, now abandoned, and U.S. Ser. No. 183,609.

As shown in FIG. 2, the compressor (26) is in series with the motor-driven cabin compressor (42), and so the pressure-ratio developed across the cabin compressor (42) can be reduced by the magnitude of the pressure-rise developed across the compressor (26). Again, assuming 150 hp is available to the compressor (26), the possible pressure-rise would be a function of the required cabin air flow. If the desired design cabin air flow is 5 pps (300 ppm), then a compressor (26) pressure-ratio of approximately 1.75 is possible. If the dynamic pressure-inlet to compressor (26) is, for example, 4.5 psia, then the "supercharge" into the cabin compressor is 7.8 psia; therefore if a duct-pressure of 12.6 psia is required, then the pressure/ratio of the cabin compressor (42) need only be 1.6:1. The cabin compressor could then only require 160 hp to drive it, compared to 280 hp if it had to develop a 2.8:1 pressure ratio.

Another benefit of the pressure-boost system of FIG. 2 is that it can be cut-out at lower altitudes, when higher air densities and ambient-pressures would create overloading of the motor (44). Typically, the turbo-compressor (30) could be cut-out below, for example, 15,000 ft altitude and the cabin compressor (42) could then supply the pressurization needs by itself. In a non-boosted (conventional) system, high pressure-losses, and low efficiencies, are incident upon the low altitude operating condition. To improve the thermodynamic cycle and efficiency of the system described herein, cold air from the output of the turbine (18) drive is passed through the heat exchanger (24), prior to dumping overboard.

Since the compressors (26) and (42) are in series, a balance must be maintained within the ECS so that the aircraft cabin (16) is always provided with air at the desired pressure at any point in time. To that end, the pressure sensors and control transducers (48) and (49) are provided so as to continuously monitor the air pressure emanating from the compressor (26) and entering the cabin (16), respectively. These sensors provide a signal, such as an electric analog signal representative of the pressure values at those points, to the inlet guide van control circuit (40'). The guide van control circuit (40') continuously monitors in known fashion, the differences between the design or desired cabin pressure and the pressure supercharge provided by the compressor (26), and in response thereto, operates the inlet guide vane control system (46) of the cabin compressor (42) such that the rise in pressure across the compressor (42), plus that across compressor (26), totals the desired cabin inlet pressure. When energy recovery system (20) is not in operation, ram air can be provided to the inlet of the cabin compressor (42) via operation of the bypass valves (28) and (32).

In another variation of the present invention, as represented in FIG. 3, a "fresh-air make-up"—"energy recovery" system as shown in FIG. 1 is utilized in conjunction with the electric motor driven cabin compressor (42) of FIG. 2. As in FIG. 1, the modified energy recovery system (20") utilizes normally wasted overboard discharge air to provide conditioned air to the aircraft cabin (16). In producing this supply of conditioned air, the requirements of air from the output of the cabin compressor (42) are accordingly reduced. To that end, the mass flow sensors (34) and (38) are utilized, via the inlet guide van control circuit (40'), to adjust the inlet guide vanes (46) of compressor (42), and to produce the desired cabin compressor output. Thus, as discussed hereinabove with reference to FIG. 1, the "make-up"—"energy recovery" system (20") is capable of reducing the required power input to the cabin compressor (42) by as much as about 52% of the total aircraft air conditioning requirement.

FIG. 4 shows yet another embodiment of an "energy recovery" system in accordance with the present invention, wherein power from the cabin (16) discharge-air can be applied directly to an air turbine motor (19) by opening a valve (21) and closing a dump valve (23). The air turbine motor (19) is mounted on the same shaft of the electric motor (44) that drives the cabin compressor (42). This air turbine motor (19) also incorporates guide vanes (47) for flow control, and these are actuated by a cabin pressure sensor and control transducer (48), which controls an electronic actuator forming a part of the inlet guide vane control (41). Operation is similar to that described hereinabove in relation to FIG. 2 in that the cabin, or inlet duct, pressure is monitored by the pressure sensor and control transducer (49) which controls the inlet guide vanes (46) via the inlet guide vane control (40'). At the same time, the pressure sensor and control transducer (48), sensing the cabin pressure, controls the guide vanes (47) on the air turbine motor (19).

The power feedback contribution to the motor (44) depends upon the available discharge-energy from the cabin: when it is high the guide vanes (47) open, allowing the maximum torque-assist to the motor (44) driving the cabin compressor (42). Since the motor (44) may, typically, be a low-step induction motor, its speed can be relatively constant. In that instance, reduction in motor-torque, resulting from the torque assist from the air turbine motor (19), results only in a slight rise in the speed of the cabin compressor (42). As the aircraft descends from its highest operating altitude, the air density and pressure increases, resulting in a change in inlet guide vane angle on the cabin compressor (42). When continued descent increases the density and pressure further, the inlet guide vanes (46) reach their maximum limit. Increases in cabin pressure at this point can be controlled by modulation of the emergency dump-valve (23), but, as in all the other embodiments described herein, the motor (42) speed can be reduced, as by means of pole-changing: a technology well-known by those versed in the art. When the motor speed is reduced, the guide vanes (46) are again brought into their operating range. It is therefore evident and implicit, in the description, that the energy-recovery system (in all embodiments herein) is not required at the lower altitudes. As state, the point-design of the ECS is set by the maximum altitude condition, where more advantage is to be gained by the feedback energy.

There have been disclosed, in accordance with the present invention, several embodiments of a balanced power ECS which regenerate the energy of air typically dumped overboard in an aircraft, and thus wasted. While the energy recovery system of the present invention has been described with reference to particular embodiments, it should be understood that such embodiments are merely illustrative, as there are numerous variations and modifications which may be made by those skilled in the art. For example, it should be readily apparent that if it is determined that additional cooling of the makeup air produced by the turbo-compressor unit (30) of FIGS. 1 and 3 is desired, this air may be delivered to the ECS pack (14) for necessary cooling. Thus, the invention is to be construed as being limited only by the spirit and scope of the appended claims.

Industrial Application

The cabin air discharge energy recovery systems of the present invention are useful, for example, in conjunction with "bleed air", "mechanically" and "electrically" driven ECS for aircraft. The recovery systems comprise a fresh-air "make-up" system, cabin compressor inlet "pressure-boost" system and cabin compressor drive-motor assist system for optimizing the efficiency of the ECS by utilizing the energy of normally-wasted aircraft cabin discharge air.

We claim:

1. An aircraft environmental control system for supplying a predetermined amount of conditioned air to an aircraft cabin, comprising:
   an electric motor;
   a cabin compressor arranged to be driven by said electric motor, said cabin compressor having an outlet adapted and arranged to supply heated and pressurized air to said cabin;
   a supercharging compressor connected in series between a source of fresh air and an inlet of said motor-driven cabin compressor;
   a free-running turbine mechanically coupled to said supercharging compressor to form a turbo-compressor arranged and adapted to be driven solely by discharge air emanating from said cabin, whereby the inlet of said motordriven cabin compressor may be provided with pressurized fresh air when said cabin is discharging pressurized air overboard.

2. An environmental control system as in claim 1 wherein said predetermined amount of conditioned air exceed the amount of air desired in said aircraft cabin during flight, said turbo-compressor being arranged so as to be driven by said excess air as it is discharged from said cabin.

3. An environmental control system as in claim 2 including a heat exchanger interposed between said supercharging compressor and said motor-driven cabin compressor.

4. An environmental control system as, in claim 3 including means for optionally directing the heated air output of said supercharging compressor through said heat exchanger.

5. An environmental control system as in claim 4 including means for directing said discharge air through said heat exchanger after it has passed through said turbo-compressor.

6. An environmental control system as in claim 2 wherein said turbo-compressor includes means for by-passing said excess discharged air.

7. An environmental control system as in claim 2 wherein said motor-driven cabin compressor includes inlet guide vane means for controlling the pressure rise across said motor-driven cabin compressor.

8. An environmental control system as in claim 7 including control means for monitoring the air pressure at the input to said cabin and for adjusting said inlet guide vane means in response to said monitored data, so that the desired input of conditioned air to said cabin is maintained.

9. A process for supplying a predetermined amount of conditioned air to an aircraft cabin during flight, comprising the following steps:

providing an electric motor;
providing a primary cabin compressor;
adapting and arranging said cabin compressor to be driven by said motor with an inlet and an outlet respectively in communication with a source of fresh air and with said cabin;
connecting said motor to a continuing supply of electrical power to thereby drive said cabin compressor and provide a supply of heated and pressurized fresh air to said cabin;
providing a supercharging compressor;
connecting said supercharging compressor in series between said cabin compressor and said source of fresh air; and
driving said supercharging compressor solely with energy extracted from discharge air emanating from said cabin to thereby reduce the electrical energy required to operate said motor.

10. A process as in claim 9 wherein the amount of conditioned air supplied to said cabin exceeds the amount of air desired in said cabin, said driving of said supercharging compressor further comprising the steps of:
discharging said excess air from said cabin;
providing a turbine adapted to be driven by said discharged air, said supercharging compressor being arranged so as to be driven by said turbine;
supplying the inlet of said supercharging compressor with ram air; and
driving said turbine with said excess discharged air to drive said supercharging compressor and supercharge said inlet of said motor-driven cabin compressor.

11. A process as in claim 10 further including the steps of:
providing a heat exchanger in series between said supercharging compressor and said motor-driven cabin compressor;
passing the outlet air from said turbine through said heat exchanger; and
cooling the hot-pressurized fresh-air from the outlet of said supercharging compressor by passing it through said heat exchanger prior to being introduced into said inlet of said motor-driven cabin compressor.

12. A process as in claim 10 further including the steps of:
providing means to monitor the pressure of the output of said supercharging compressor and the input pressure of conditioned air to said cabin;
providing inlet guide vanes on said motor-driven cabin compressor;
monitoring the values of the output pressure of said supercharging compressor and the input pressure of conditioned air to said cabin; and
in response to said values, controlling the pressure rise across said motor-driven cabin compressor by adjusting said inlet vanes such that the desired input of conditioned air to said cabin is attained.

* * * * *